United States Patent
Kim

[19]

[11] Patent Number: 5,984,354
[45] Date of Patent: *Nov. 16, 1999

[54] ENERGY ABSORBING STEERING SYSTEM FOR AUTOMOBILES

[75] Inventor: Ji-Yeol Kim, Chullabuk-Do, Rep. of Korea

[73] Assignee: Mando Machinery Corporation, Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,592

[22] Filed: Apr. 21, 1997

[30] Foreign Application Priority Data

Apr. 30, 1996 [KR] Rep. of Korea ............... 96-14050

[51] Int. Cl.⁶ ................................................. B62D 1/19
[52] U.S. Cl. ..................... 280/777; 74/492; 188/371
[58] Field of Search ................... 280/777; 74/492; 188/371, 374

[56] References Cited

U.S. PATENT DOCUMENTS

| | | | |
|---|---|---|---|
| 3,392,599 | 7/1968 | White | 280/777 |
| 3,788,148 | 1/1974 | Connell et al. | 74/492 |
| 3,815,438 | 6/1974 | Johnson | 74/492 |
| 4,006,647 | 2/1977 | Oonuma et al. | 74/492 |
| 4,509,386 | 4/1985 | Kimberlin | 74/492 |
| 5,544,542 | 8/1996 | Nakajima | 74/492 |

FOREIGN PATENT DOCUMENTS

| | | | |
|---|---|---|---|
| 57-201761 | 12/1982 | Japan | 280/777 |
| 1369188 | 10/1974 | United Kingdom . | |

*Primary Examiner*—Peter C. English
*Attorney, Agent, or Firm*—John P. White; Cooper & Dunham LLP

[57] ABSTRACT

A steering system of automobiles for absorbing impact force, which comprises a steering tube, connected to a steering handle, having a plurality of fixing openings for fixing balls therein; a steering shaft partially inserted into the steering tube and having a plurality of multi-stepped guide grooves for guiding the balls; and the balls positioned in the fixing openings of the steering tube. The guide grooves are adjacent to the fixing openings at one end and extended longitudinally for a predetermined distance, and the balls travel from the fixing openings into the multi-stepped guide grooves between the steering tube and the steering shaft, generating frictional force and absorbing impact force. Hence, the impact force is absorbed by the multi-stepped portions of the guide grooves and gradually transmitted to the driver from the beginning to the end of a collision to ensure the driver with enough time to react to the collision, thereby minimizing injury to the driver.

4 Claims, 4 Drawing Sheets

ENERGY ABSORBING STEERING SYSTEM FOR AUTOMOBILES

BACKGROUND OF THE INVENTION

1. Field of the Invention

The present invention relates to a steering system for automobiles and, more particularly, to a steering system of automobiles for absorbing impact energy when force is generated from the collision in order to lessen the impact force to the driver.

2. Description of the Conventional Art

In general, the steering by the driver is transmitted to a steering tube and a steering shaft in the conventional steering systems for automobiles.

During the collision, the driver collides with the steering wheel caused by the inertia. In response to the collision, there is a reaction force in which the driver is more severely injured.

In order to absorb the impact energy and lessen the impact to the driver, the steering shaft that slides into the steering tube that is connected to the steering wheel has been developed.

FIG. 1 shows the structure of a conventional steering system which has been developed to lessen the impact to the driver during the collision.

In FIG. 1, the steering system comprises an outer tube 12, an inner tube 14, and balls 22, 24 which are inserted between the outer tube 12 and the inner tube 14. Further, grooves 26 are formed on the outer surface of the inner tube 14 for guiding the balls 22 and 24.

In the above structure, the number of the grooves 26 is less than the number of the balls 22 and 24 so that the impact force is absorbed by the remaining balls which are not introduced into the grooves. When the inner tube 14 slides into the outer tube 12 by the impact force applied to a steering wheel(not shown) at the time of the collision, the balls 22 and 24 located between the outer tube 12 and the inner tube 14 move and absorb the impact force by frictional force generated by the movement of the balls.

In FIG. 1, number 20 indicates a sleeve, and number 28 indicates a slanted wall.

However, the conventional steering system described above has disadvantages that the steering system absorbs the impact force uniformly regardless of the magnitude of the impact force, so that it is difficult to disperse the repulsive force to the driver.

The balls 24 absorb the impact force uniformly from the beginning to the end of the collision, hence the repulsive force can not be dispersed effectively and the driver would not have enough time to react to the collision. Hence, it is difficult to prevent the driver from being injured from the repulsive force generated by the impact.

SUMMARY OF THE INVENTION

The present invention attempts to resolve the disadvantages of the prior art and provide a steering system of automobiles for absorbing the impact force, which disperses and absorbs sequentially the impact force transmitted through the steering shaft and the steering tube during the collision to lessen the impact force thus protecting the driver.

Another object of the present invention is to provide a steering system of automobiles for absorbing impact force, which can delay the repulsive force to the driver in order to provide enough time for the driver to react to emergency situations during the collision.

According to the present invention, the above objects can be achieved by a steering system of automobiles for absorbing impact force which comprises a steering tube connected with a steering handle; a plurality of fixing openings for placing balls therein; a steering shaft partially inserted into the steering tube; a plurality of multi-stepped guide grooves for guiding the balls; and the balls which are positioned in the fixing openings of the steering tube, wherein the guide grooves are adjacent to the fixing grooves at one end part and extended laterally for a predetermined distance, and the balls are guided from the fixing openings into the guide grooves between the steering tube and the steering shaft, generating frictional force and absorbing impact force.

BRIEF DESCRIPTION OF THE DRAWINGS

The manner by which the above and other objects, features and advantages of the present invention are attained will become fully apparent from the following description to be made with reference to the accompanying drawings, in which.

DETAILED DESCRIPTION OF THE INVENTION

The invention will now be described in detail with reference to the drawings showing the preferred embodiments.

Figure 1:
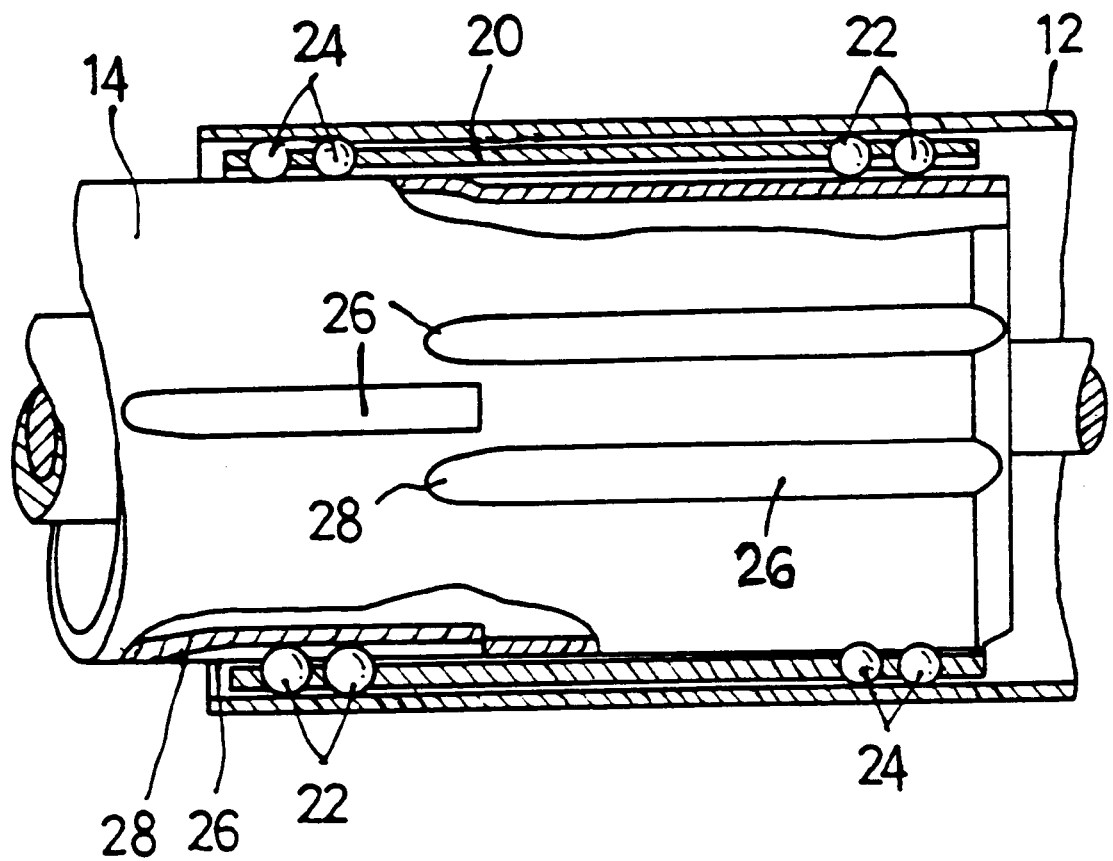
FIG. 1 is a transverse sectional view of a prior art steering system for automobiles.
Figure 2:
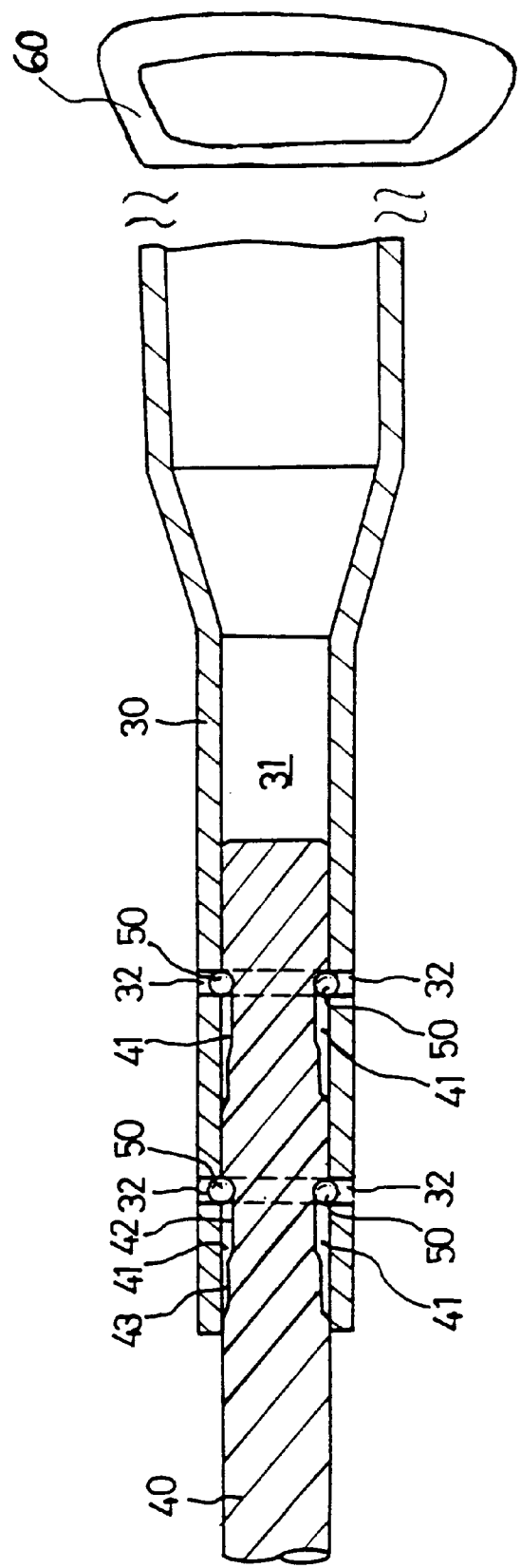
FIG. 2 is a transverse sectional view of the steering system of automobiles for absorbing impact energy according to the present invention.
Figure 3:
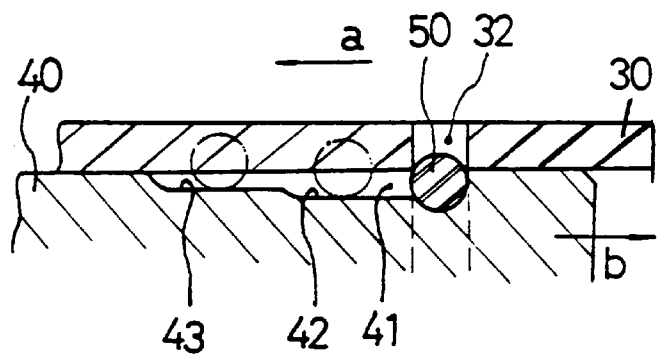
FIG. 3 is a transverse sectional view for explaining the operation of the steering system according to the present invention.

FIG. 2 shows the structure of a steering system for automobiles according to an embodiment of the present invention.

In FIG. 2, the steering system comprises a steering tube 30, a steering shaft 40, and a plurality of balls 50. The steering tube 30 connected with a steering handle 60 includes a plurality of fixing openings 32 for placement of the balls 50 and a hollow portion of the steering tube 31. The number of the fixing openings 32 may be adjusted according to the steering force required, and four fixing openings 32 are adopted in this embodiment.

The steering shaft 40 is partially inserted into the hollow portion 31 of the steering tube 30. The steering shaft 40 includes guide grooves 41 for guiding the balls 50. The guide grooves 41 are adjacent to the fixing openings 32 at one end and extended longitudinally for a predetermined distance.

The guide grooves 41 have different depths and are multi-stepped, wherein those farthest from the steering handle are the highest stepped portions 43, and the opposite stepped portions 42 which are connected with the fixing openings 32 are the lowest. In this embodiment, the guide grooves 41 are of two steps.

Figure 4:
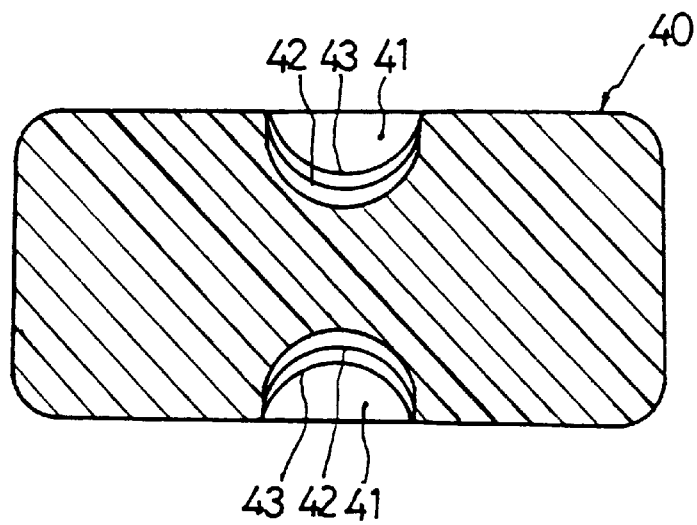
FIG. 4 is a transverse sectional view of a steering shaft of the steering system according to an embodiment of the present invention.
Figure 5:
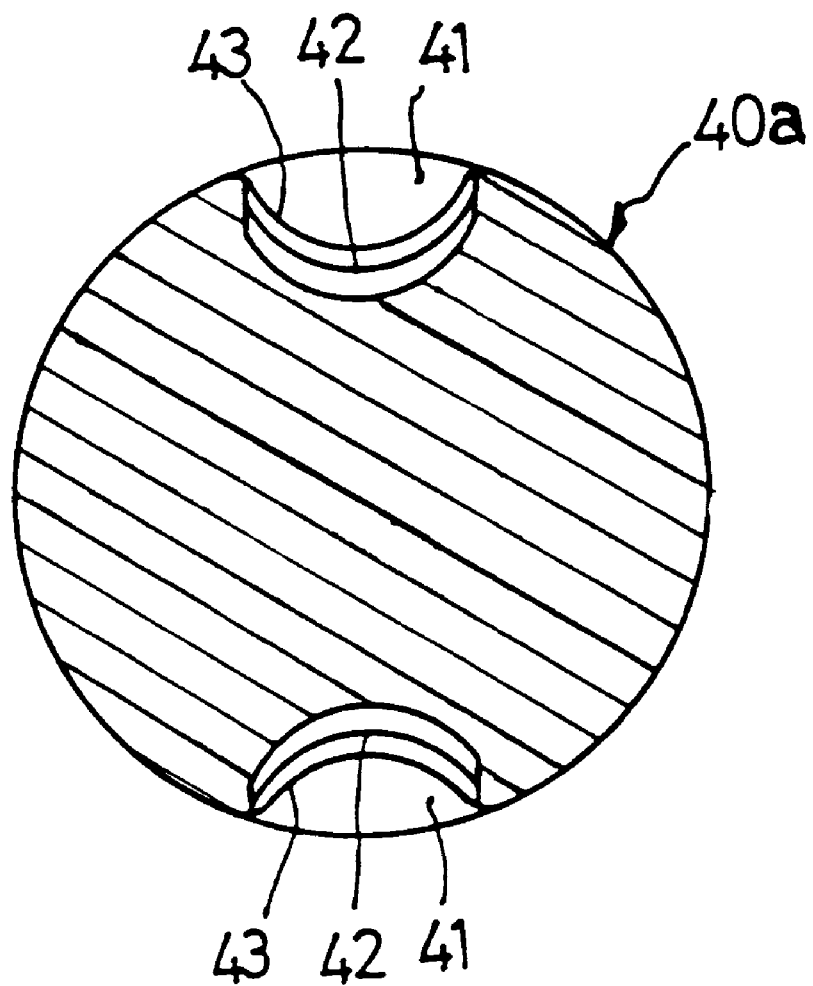
FIG. 5 is a vertical sectional view of a steering shaft 40a for the steering system according to another embodiment of the present invention.

FIG. 4 is a vertical sectional view showing the guide grooves 41. In FIG. 4, the guide grooves 41 have stepped portions 42, 43 which are sequentially grooved deeper toward the steering handle. FIG. 5 is also a vertical sectional view in which the steering shaft 40a is circular.

The balls 50 have substantially uniform size and are positioned in end parts of the fixing openings 32 of the steering tube 30, on the deepest stepped portions 42. The balls 50 travel along the guide grooves 41 at the time of the collision.

When the balls 50 move along the guide grooves 41 between the steering tube 30 and the steering shaft 40, a frictional force is generated and the impact force is absorbed by the frictional force generated by the movement of the balls 50.

The operation of the steering system for automobiles according to the present invention is described in more detail hereinafter.

In the normal state the steering shaft 40 is inserted in the hollow portion 31 of the steering tube 30. The balls 50 are located between the steering shaft 40 and the steering tube 30, That is, the balls 50 are positioned in the fixing openings 32 on the respective end parts of the lowest stepped portions 42 of the guide grooves 41 which are adjacent to the fixing openings 32.

When the steering wheel is rotated by a driver, the steering tube 30 rotates in response to the rotation of the steering wheel, and the rotating force is transmitted to the steering shaft 40. In the above case, during the collision, the driver collides with the steering handle due to inertia.

According to the present invention, the steering shaft 40 is inserted into the hollow portion 31 of the steering tube 30 and absorbs the impact energy.

In detail, the steering tube 30 moves in the direction of an arrow 'a' and the steering shaft 40 moves opposite in the direction of an arrow 'b', so that the balls 50 move into the guide grooves 41 along the stepped portions 42 and 43, wherein the balls 50 travel along the guide grooves 41 of the steering shaft 40 that are adjacent to the fixing openings 32 of the steering tube 30.

The balls 50 generate frictional force by the movement between the steering tube 30 and the steering shaft 40.

The frictional force is relatively small at the beginning of the collision but the frictional force increases toward the end of the impact. Therefore, the impact force generated during the collision is compensated by the relatively small frictional force at the beginning but the degree of compensation gradually increases, so that in the end large impact force is compensated by the frictional force generated by the balls 50.

As stated above, the frictional force is used to absorb the impact force generated at the beginning of the accident and increasing frictional force absorbs more impact force toward the end of the accident. The impact force may be effectively dispersed and the repulsive force transferred to the driver becomes gradual since the frictional force compensates the impact force gradually, and relatively big repulsive force suddenly applied to the driver may be prevented.

Hence, the impact force applied to the driver during collision is reduced and the driver may have enough time to react to the emergency situation.

According to the present invention as described hereinabove, the steering system of the present invention can control the impact force transmitted to the driver by gradually absorbing the impact force so that the absorption of the impact force may be achieved effectively.

Further, the repulsive force which is applied to the driver during the collision is gradually absorbed and transmitted to the driver so that the driver may react to the collision and minimize the injury.

Although the present invention has been fully described by way of example with reference to the accompanying drawings, it is to be noted here that various changes and modifications will be apparent to those skilled in the art. Therfore, unless such changes and modifications depart from the scope of the present invention, they should be construed as being included therein.

What is claimed is:

1. A steering system of automobiles for absorbing impact force comprising:
   a steering tube connected with a steering handle and including a plurality of fixing openings;
   a steering shaft partially inserted into said steering tube and including a plurality of multi-stepped guide grooves having different depths; and
   impact force absorbing balls, having substantially uniform size, positioned in end parts of the fixing openings, wherein said impact force absorbing balls are moved into said multi-stepped guide grooves having different depths in order to absorb and reduce an impact force occurred by an impact accident.

2. The steering system as claimed in claim 1, wherein said steering shaft has a rectangular cross section.

3. The steering system as claimed in claim 1, wherein said steering shaft has a circular cross section.

4. A steering system of automobiles for absorbing impact force comprising:
   a steering tube connected with a steering handle and including a plurality of fixing openings;
   a steering shaft partially inserted into said steering tube and including a plurality of multi-stepped guide grooves having different depths; and
   impact force absorbing balls positioned in end parts of the fixing openings, wherein said impact force absorbing balls are moved into said multi-stepped guide grooves having different depths, wherein each impact force absorbing ball travels into different stepped portions of the respective guide groove in order to absorb and reduce an impact force occurred by an impact accident.

* * * * *